United States Patent
Peng et al.

(10) Patent No.: US 9,679,380 B2
(45) Date of Patent: Jun. 13, 2017

(54) EMOTION MODIFICATION FOR IMAGE AND VIDEO CONTENT

(71) Applicant: Futurewei Technologies, Inc., Plano, TX (US)

(72) Inventors: Kuan-chuan Peng, Ithaca, NY (US); Hong Heather Yu, Princeton Jct, NJ (US); Dongqing Zhang, Plainsboro, NJ (US); Tsuhan Chen, Ithaca, NY (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/606,340

(22) Filed: Jan. 27, 2015

(65) Prior Publication Data
US 2015/0213331 A1 Jul. 30, 2015

Related U.S. Application Data

(60) Provisional application No. 61/933,763, filed on Jan. 30, 2014.

(51) Int. Cl.
*G06K 9/62* (2006.01)
*G06T 11/60* (2006.01)
(Continued)

(52) U.S. Cl.
CPC ........ *G06T 7/0026* (2013.01); *G06K 9/00684* (2013.01); *G06K 9/6215* (2013.01); *G06K 9/6269* (2013.01); *G06T 11/60* (2013.01)

(58) Field of Classification Search
CPC ............. G06K 9/00684; G06K 9/6216; G06K 9/6215; G06K 9/6277; G06K 9/6269; G06T 7/0026; G06T 11/60
See application file for complete search history.

(56) References Cited

U.S. PATENT DOCUMENTS

| | | | | |
|---|---|---|---|---|
| 6,212,502 B1 * | 4/2001 | Ball | .................. | G10L 17/26 704/270 |
| 7,154,510 B2 * | 12/2006 | Simon | .................. | G06T 11/60 345/589 |

(Continued)

OTHER PUBLICATIONS

Ou et al., "A study of colour emotion and colour preference. Part I: Colour emotions for single colours," Color Research & Application 29, No. 3 (2004): 432-440.*

(Continued)

*Primary Examiner* — Yubin Hung
(74) *Attorney, Agent, or Firm* — Conley Rose, P.C.

(57) ABSTRACT

Apparatus and method for modification of emotion conveyed by an image. In one aspect, a metric corresponding to the emotion conveyed by an image is generated, and a command for modifying the emotion of the image causes the emotion conveyed by the image to be changed according to the specified change to emotion. The command to modify the image emotion can be made via an emotion keyword, and can include an indicated magnitude of emotion change. Emotion conveyed by an image can be specified via an emotion vector, where elements of the vector correspond with emotions arranged along orthogonal dimensions in an emotion space. In one aspect, an emotion predictor is trained to predict the emotion conveyed by an image via determining characteristic values for a set of image feature categories, based on a set of images associated with emotion keywords of the emotion space.

20 Claims, 5 Drawing Sheets

(51) Int. Cl.
*G06T 7/00* (2017.01)
*G06K 9/00* (2006.01)

(56) References Cited

U.S. PATENT DOCUMENTS

| | | | | |
|---|---|---|---|---|
| 7,593,618 | B2* | 9/2009 | Xu | G06F 17/30811 386/239 |
| 2004/0039483 | A1* | 2/2004 | Kemp | B62D 57/02 700/245 |
| 2004/0095344 | A1* | 5/2004 | Dojyun | G06T 13/40 345/419 |
| 2008/0068397 | A1 | 3/2008 | Carey et al. | |
| 2008/0075336 | A1 | 3/2008 | Luo et al. | |
| 2009/0285456 | A1* | 11/2009 | Moon | G06K 9/00315 382/118 |
| 2010/0030714 | A1* | 2/2010 | Bollano | G10L 17/26 706/12 |
| 2010/0211397 | A1 | 8/2010 | Park et al. | |
| 2011/0135195 | A1* | 6/2011 | Marchesotti | H04N 1/60 382/165 |
| 2011/0274348 | A1* | 11/2011 | Oicherman | G06T 11/001 382/165 |
| 2012/0075331 | A1* | 3/2012 | Mallick | G06T 11/001 345/594 |
| 2013/0086519 | A1* | 4/2013 | Fino | G06Q 30/02 715/810 |
| 2013/0236102 | A1* | 9/2013 | Hung | G06K 9/00268 382/190 |
| 2013/0346920 | A1 | 12/2013 | Morris et al. | |
| 2014/0035929 | A1* | 2/2014 | Matthews | G06T 13/40 345/473 |
| 2014/0049546 | A1* | 2/2014 | Wang | G06T 11/20 345/441 |
| 2014/0250110 | A1* | 9/2014 | Yang | G06F 17/30867 707/723 |
| 2015/0042663 | A1* | 2/2015 | Mandel | G06N 5/02 345/474 |

OTHER PUBLICATIONS

Ou et al., "A study of colour emotion and colour preference. Part II: Colour emotions for two-colour combinations," Color Research & Application 29, No. 4 (2004): 492-498.*
International Search Report, Dated Apr. 13, 2015, PCT/US15/13068.
Machajdik, J., et al., "Affective Image Classification using Features Inspired by Psychology and Art Theory," International Conference on Multimedia, ACM, Oct. 25-29, 2010, pp. 83-92.
Solli, M., et al., "Emotion Related Structures in Large Image Databases," International Conference on Image and Video Retrieval, ACM, Jul. 5-7, 2010, 8 pages.
Wang, X., et al., "Interpretable Aesthetic Features for Affective Image Classification," International Conference on Image Processing, IEEE, 2013, pp. 3230-3234.
Joshi, D., et al., "Aesthetics and Emotions in Images: A Computational Perspective," IEEE Signal Processing Magazine, vol. 28, No. 5, 2011, 44 pages.
Fontaine, J. R. J., et al., "The World of Emotions Is Not Two-Dimensional," Research Report, Psychological Science, vol. 18, No. 12, 2007, pp. 1050-1057.
Plutchik, R., "A General Psychoevolutionay Theory of Emotion," Emotion: Theory, Research, and Experience, vol. 1: Theories of Emotion, 1980, pp. 3-33.
Dan-Glauser, E., et al., "The Geneva affective picture database (GAPED): a new 730-picture database focusing on valence and normative significance," Behavior Research Methods, vol. 43, No. 2, Mar. 24, 2011, pp. 468-477.
Wang, X., et al., "Affective image adjustment with a single word," The Visual Computer, Oct. 27, 2012, pp. 1121-1133.
Ortony, A., et al., "What's Basic About Basic Emotions?," Psychological Review, vol. 97, No. 3, 1990, pp. 315-331.
Wundt, W., "Outlines of Psychology," Classics in the History of Psychology, 1897, 653 pages.
Chang, C., et al., "LIBSVM: A Library for Support Vector Machines," ACM Transactions on Intelligent Systems and Technology, vol. 2, 2011, 39 pages.
Mignotte, M., "An Energy Based Model for the Image Edge Histogram Specification Problem," IEEE Transactions on Image Processing, vol. 21, No. 1, 2011, 9 pages.
Peng, K., et al., "Using Soft-Label Emotion Prediction in Changing Image Emotion," IEEE International Conference on Image Processing, Oct. 2014, 3 pages.
Yang, C., et al., "Automatic Mood-Transferring between Color Images," Computational Aesthetics, vol. 28, No. 2, Mar./Apr. 2008, pp. 52-61.
Ryoo, S., et al., "Emotion Affective Color Transfer Using Feature Based Facial Expression Recognition," Advanced Science and Technology Letters, vol. 39, Dec. 11, 2013, pp. 131-135.
Foreign Communication From a Counterpart Application, European Application No. 15743410.1, Extended European Search Report dated Feb. 13, 2017, 8 pages.

* cited by examiner

Emotion modification
for increased joy

EMOTION MODIFICATION FOR IMAGE AND VIDEO CONTENT

CROSS-REFERENCE TO RELATED APPLICATIONS

This application claims priority from U.S. Provisional Patent Application Ser. No. 61/933,763, filed Jan. 30, 2014, entitled "Method and Apparatus for Image and Video Content Classification via Emotion Experiential Analysis," the entire content of which is incorporated herein by reference.

FIELD OF THE INVENTION

Embodiments of the present disclosure generally relate to image classification in computer vision. More specifically, embodiments of the present disclosure relate to modeling emotion content in an image, and enabling organization and searching of visual data with emotion primitives.

BACKGROUND

In general, an image evokes emotion in a viewer differently, based not only on the content of the image but also upon the individual experiences of the viewer. For example, an image of a certain kind of food, like a hamburger, may elate some fast food lovers, while others may be irritated due to health reasons.

In computer vision, efforts are being made toward categorizing images via abstract concepts like affective image classification and aesthetic quality estimation. A variety of image sources, for example Internet images and abstract paintings and artistic pictures, are studied in recent literature regarding affective image classification in computer vision. Several efforts are directed toward affective image classification on both realistic and artistic images. These efforts typically describe the emotion elicited by a particular image using hard labels, that is, a fixed label describing the emotion content of the image.

Conventional approaches treat different emotion categories independently in a 1-vs-all setting of multi-class classification. This is despite the inconsistency of this approach with the notion that some emotion categories are closely related. For example, joy and sadness have strong negative correlation. Many emotion-related image categorization schemes use image databases, such as emodb (M. Solli and R. Lenz, "Emotion related structures in large image databases," in International Conference on Image and Video Retrieval. ACM, 2010, pp. 398-405.), GAPED (E. S. Dan-Glauser and K. R. Scherer, "The geneva affective picture database (GAPED): a new 730-picture database focusing on valence and normative significance.," Behavior Research Methods, vol. 43, no. 2, pp. 468-477, 2011.), and IAPS (P. J. Lang, M. M. Bradley, and B. N. Cuthbert, "International affective picture system (ZAPS): affective ratings of pictures and instruction manual. technical report a-8.," 2008.), that suffer from several drawbacks. Firstly, these image databases assign hard labels to images, ignoring the fact that there is not necessarily consensus amongst viewers of an image in terms of emotion experienced. Further, even with a similar kind of emotion experienced, conventional databases do not capture the notion that the degree of emotion may vary (for example, joy vs. ecstasy). Secondly, the emotion categories of these databases are chosen in an ad-hoc way without solid foundation of psychological theories. Thirdly, the number of images in each emotion category is not equal in these databases, resulting in an unbalanced database that may cause bias in image categorization results.

SUMMARY

Recognizing that an image in general evokes people's emotions differently, embodiments according to the present disclosure describe the emotion associated with an image using soft labels (e.g., real numbers) rather than hard labels. Emotions are mapped in a dimensional model in emotion space, the emotions arranged in opposing pairs along orthogonal axes, the emotions based on psychological studies.

According to aspects of the present disclosure, an apparatus and method are provided for modification of emotion conveyed by an image. In one aspect, a metric corresponding to the emotion conveyed by an image is generated, and a command for modifying the emotion of the image causes the emotion conveyed by the image to be changed according to the specified change to emotion. The command to modify the image emotion can be made via an emotion keyword, and can include an indicated magnitude of emotion change. Emotion conveyed by an image can be specified via an emotion vector, where elements of the vector correspond with emotions arranged along orthogonal dimensions in an emotion space. In one aspect, an emotion metric is trained to predict the emotion conveyed by an image via determining characteristic values for a set of image feature categories, based on a set of images associated with emotion keywords of the emotion space.

According to an aspect of the present disclosure, a method of modifying an image to change an emotion conveyed by the image includes accessing an image stored in a memory, and generating a metric corresponding to emotions conveyed by the image, where the emotions arranged along a plurality of emotion dimensions. The method includes receiving a command to modify the image according to a specified change to a particular emotion, and transforming the image by modifying the image according to predefined image features corresponding to the emotion, in accordance with the specified change to the particular emotion. The method includes displaying a transformed image with the change in the particular emotion.

In an embodiment of the method the metric includes values corresponding to magnitudes of the emotions conveyed. According to a further embodiment the specified change to the particular emotion includes a magnitude of change. According to a further embodiment the metric is arranged in a vector including elements corresponding to the plurality of emotion dimensions. In an embodiment the plurality of emotion dimensions include orthogonal axes, and pairs of negatively correlated emotions are arranged on opposing ends of the orthogonal axes. According to a further embodiment the pairs of negatively correlated emotions include joy and sadness; fear and non-fear; and, disgust and non-disgust. According to a further embodiment the specified change to the particular emotion includes a keyword associated with the pairs of negatively correlated emotions. In an embodiment of the method the predefined image features include edge features, texture, color, saliency, and shape, and modifying the image includes modifying according to one of color histogram specification and edge-histogram specification.

According to another aspect of the present disclosure, an apparatus includes a display, a memory configured to store instructions, and a processor communicatively coupled with the display and the memory and configured to execute the instructions. The instructions cause the processor to access an image stored in the memory and to generate a metric corresponding to emotions conveyed by the image, the emotions arranged along a plurality of emotion dimensions. The instructions cause the processor to receive a command to modify the image according to a specified change to a particular emotion. The instructions cause the processor to transform the image by modifying the image according to predefined image features corresponding to the emotion, in accordance with the specified change to the particular emotion, and the instructions cause the processor to display a transformed image with the change in the particular emotion.

In an embodiment of the apparatus the metric includes values corresponding to magnitudes of the emotions conveyed. According to a further embodiment the specified change to the particular emotion includes a magnitude of change. According to a further embodiment the metric is arranged in a vector including elements corresponding to the plurality of emotion dimensions. In an embodiment the plurality of emotion dimensions include orthogonal axes, and pairs of negatively correlated emotions are arranged on opposing ends of the orthogonal axes. According to a further embodiment the pairs of negatively correlated emotions include joy and sadness; fear and non-fear; and, disgust and non-disgust. According to a further embodiment the specified change to the particular emotion includes a keyword associated with the pairs of negatively correlated emotions. In an embodiment of the apparatus the predefined image features include edge features, texture, color, saliency, and shape, and modifying the image includes modifying according to one of color histogram specification and edge-histogram specification.

According to another aspect of the present disclosure, a non-transitory computer readable medium contains programmed instructions, which, when executed by a processor in an image processing system, cause the processor to perform operations. The operations include accessing an image stored in a memory, and generating a metric corresponding to emotions conveyed by the image, where the emotions arranged along a plurality of emotion dimensions. The operations include receiving a command to modify the image according to a specified change to a particular emotion, and transforming the image by modifying the image according to predefined image features corresponding to the emotion, in accordance with the specified change to the particular emotion. The operations include displaying a transformed image with the change in the particular emotion.

In an embodiment of the non-transitory computer readable medium containing programmed instructions, the metric includes values corresponding to magnitudes of the emotions conveyed. In an embodiment of the non-transitory computer readable medium containing programmed instructions, the predefined image features include edge features, texture, color, saliency, and shape, and modifying the image includes modifying according to one of color histogram specification and edge-histogram specification. According to a further embodiment, the predefined image features are based on a sample image associated with the particular emotion.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
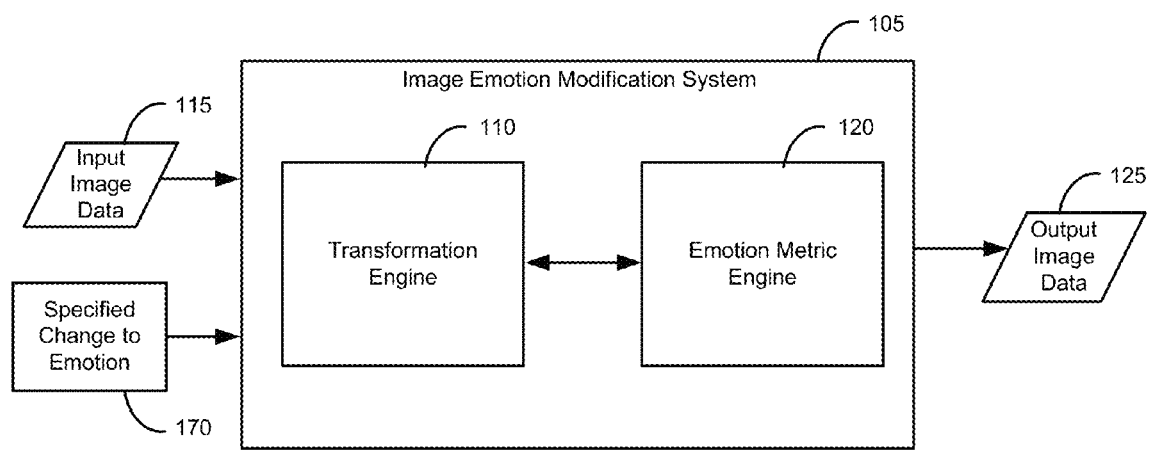
FIG. 1 is an illustration of an image emotion modification system according to an embodiment of the present disclosure.

In contrast to conventional efforts regarding affective image classification in computer vision, which treat emotion categories independently and predict emotion via hard labels, ignoring the correlation between emotion categories, embodiments of the present disclosure use a dimensional emotion space to model the correlation between certain emotion categories. A system and method of changing image emotion is disclosed, including an emotion predictor for predicting the emotion conveyed by an image. The emotion conveyed by an image can be changed by, for example, color histogram specification, guided by the image features of a sample image taken from a set of sample images having labeled emotion content.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A system according to the present disclosure enables modification of the emotion conveyed by an image, via specification of an emotion keyword and a magnitude of change. As a non-limiting example, the keyword can be "joy," with a magnitude of change corresponding to a relative change from the initial emotion conveyed (e.g., 0.1 corresponding to 10% more joy than that present in the initial image). The system transforms the input image to a sample output image that is more correlated with the emotion indicated by user input (e.g., the output image contains more "joy" conveyed following the transformation).

Referring now to FIG. 1, an image emotion modification system 105 includes a transformation engine 110 and an emotion metric engine 120. The image emotion modification system 105 is configured to receive an input image 115, and a specified change to emotion 170. The emotion modification is to the emotion conveyed by the input image 115, for example, a modification to the amount of the emotion "fear" that the input image 115 evokes in a viewer. The image emotion modification system 105 uses the transformation engine 110 and emotion metric engine 120 in order to transform the input image 115 according to the specified change to emotion 170, and outputs an image according to a specified change to emotion as output image 125. Image emotion modification system 105 will be better understood according to the description below.

Emotion Category

Figure 2:
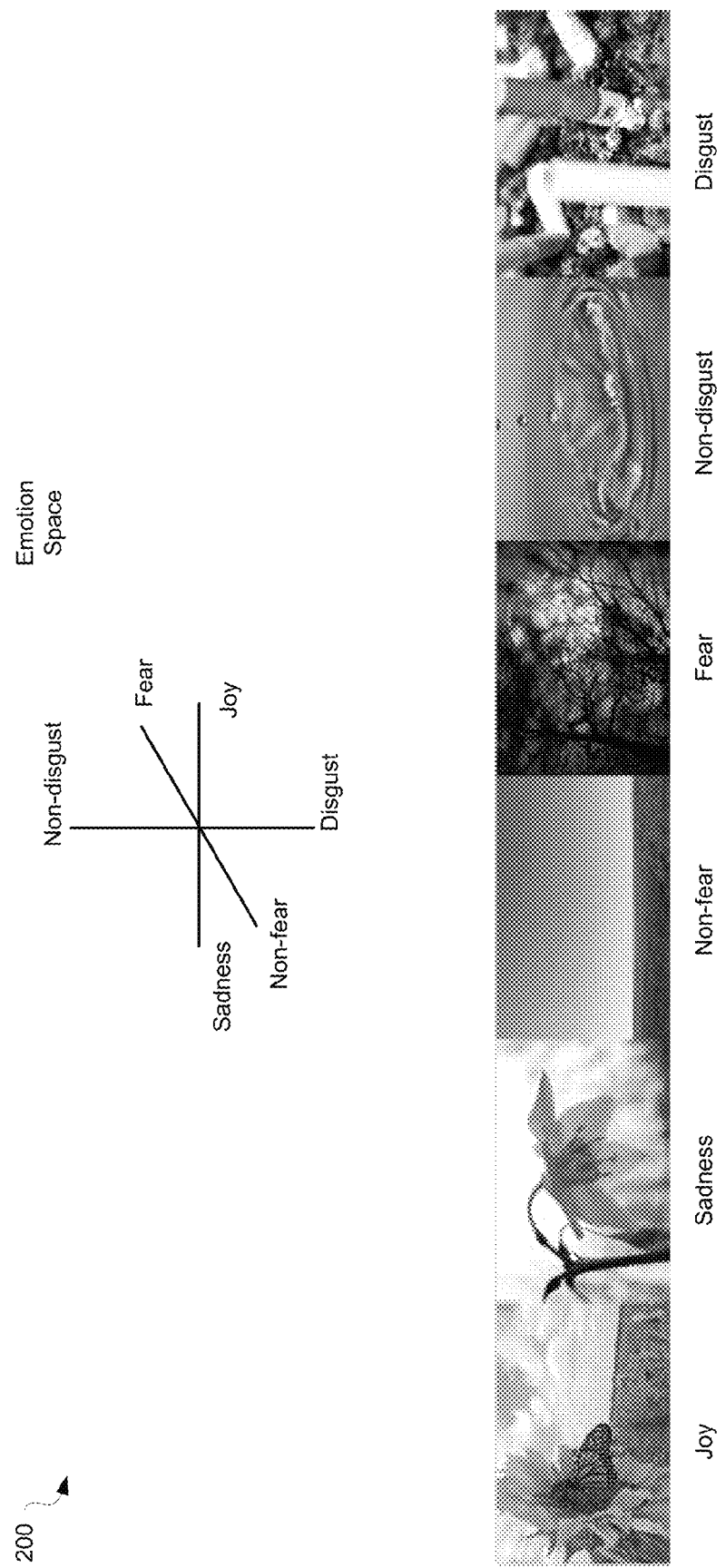
FIG. 2 is an illustration of an exemplary emotion space, and images corresponding to emotions of the emotion space, according to embodiments of the present disclosure.

Referring now to FIG. 2, a dimensional emotion model consistent with soft labeling is depicted according to embodiments of the present disclosure. Three dimensions $d_i (i \in \{1, 2, 3\})$ are defined in an emotion space 200, where each dimension represents some basic emotion, for example, a basic emotion in Plutchik's wheel (R. Plutchik, "A general psychoevolutionary theory of emotion," Emotion: Theory, Research, and Experience, vol. 1, pp. 3-31, 1980.). In the emotion model according to the present disclosure, three emotion dimensions describing opposing emotions are arranged in emotion pairs, the emotion dimensions in one embodiment being joy—sadness ($d_1$), non-fear—fear ($d_2$), and non-disgust—disgust ($d_3$). A larger or smaller number of emotion dimensions are possible, as are other emotions.

These emotions form three dimensions and correspond with the emotion categories of the soft-label emotion metric database, described further below. FIG. 2 depicts exemplary images 210 representative of the emotions in emotion space 200, one image each for emotions joy, sadness, non-fear, fear, non-disgust, and disgust.

Emotion Metric Vector

According to embodiments of the present disclosure, the emotions in the dimensions of emotion space 200 can be arranged in a vector, and normalized. For a three-dimension emotion space 200 depicted in FIG. 2, the emotion vector can have elements s1, s2, and s3 corresponding to the $d_1$, $d_2$ and $d_3$, dimensions, respectively. For example, the joy-sadness dimension can correspond to dimension s1, where an s1 value of 1 corresponds to maximum joy, and an s1 value of 0 corresponds to maximum sadness. In a similar manner, the non-fear—fear dimension can correspond to dimension s2, where an s2 value of 1 corresponds to maximum non-fear, and an s2 value of 0 corresponds to maximum fear. In a similar manner, the non-disgust—disgust dimension can correspond to dimension s3, where an s3 value of 1 corresponds to maximum non-disgust, and an s3 value of 0 corresponds to maximum disgust.

Soft-Label Emotion Metric Database

In an embodiment, the soft-label emotion metric database (e.g., database including sample images 330 of FIG. 3) contains feature categories correlated to the emotions forming three dimensions in emotion space. Table 1 includes exemplary feature categories, along with respective dimensions and a description thereof. The feature categories can be, for example "edge" with a dimension 512, "texture" with dimension of 27, "color" with a dimension of 80, "saliency" with a dimension of 4, "composition" with a dimension of 8, and "shape" with a dimension of 128.

TABLE 1

Feature set for training emotion conveyed metric.

| Category | Dimension | Description |
|---|---|---|
| Edge | 512 | cascaded edge histograms in the most/least salient regions |
| Texture | 27 | features from gray-level co-occurrence matrix and Tamura features |
| Color | 80 | cascaded CIECAM02 color histograms in the most/least salient regions |
| Saliency | 4 | the differences of areas/color/edge features in the most/least salient regions |
| Composition | 8 | rule of third, diagonal dominance, symmetry, and visual balance |
| Shape | 128 | features of the fit ellipses of the segments from color segmentation |

According to embodiments of the present disclosure, the soft-label emotion metric database includes images for each emotion category. For example, the soft-label emotion metric database includes 500 images for each emotion category, totaling 3000 images for a six-category database. The database images can be resized to approximately a same resolution, for example VGA resolution, while maintaining the original aspect ratio of the image. According to an embodiment, the database images can be acquired by entering the six category keywords as searching keywords into image databases available on the Internet, for example Flickr. Other web services may be used, and other sources of images are also consistent with the present disclosure. In a non-limiting example, synonyms and antonyms of joy, fear, and disgust are used as searching keywords. Preferably, each image downloaded to the soft-label emotion metric database is verified to correspond with the expected emotion. That is, an image downloaded using a "fear" keyword is verified to correspond to a "fear" emotion content, for example, by manual inspection. The verification is made in order to prevent erroneous image classifications.

The soft-label emotion metric database provides a correlation between the values of image features from the feature categories with emotions in the dimensional emotion model, to provide a measure of the emotion conveyed by the image (e.g., for emotion prediction). Each image in the database is assigned a binary label corresponding to one of the three dimensions. That is, each image is associated with one emotion, for example "joy," and is not associated with any other emotion. In an embodiment, the image association is determined by a binary value, where a "1" corresponds to a positive emotion and where a "0" corresponds to a negative. Therefore, for an image associated with "joy," an emotion value for the image includes a "1" in the joy-sadness dimension. Conversely, an image associated with "sadness" includes a "0" in the joy-sadness dimension. Similar values are associated with images corresponding to the non-disgust—disgust emotion pair, and the non-fear—fear pair, where a "1" indicates non-disgust and non-fear, and where a "0" indicates "disgust" and "fear."

The details about the selection of emotion categories, image collection, and labeling procedure are described below.

Emotion Modification

Figure 3:
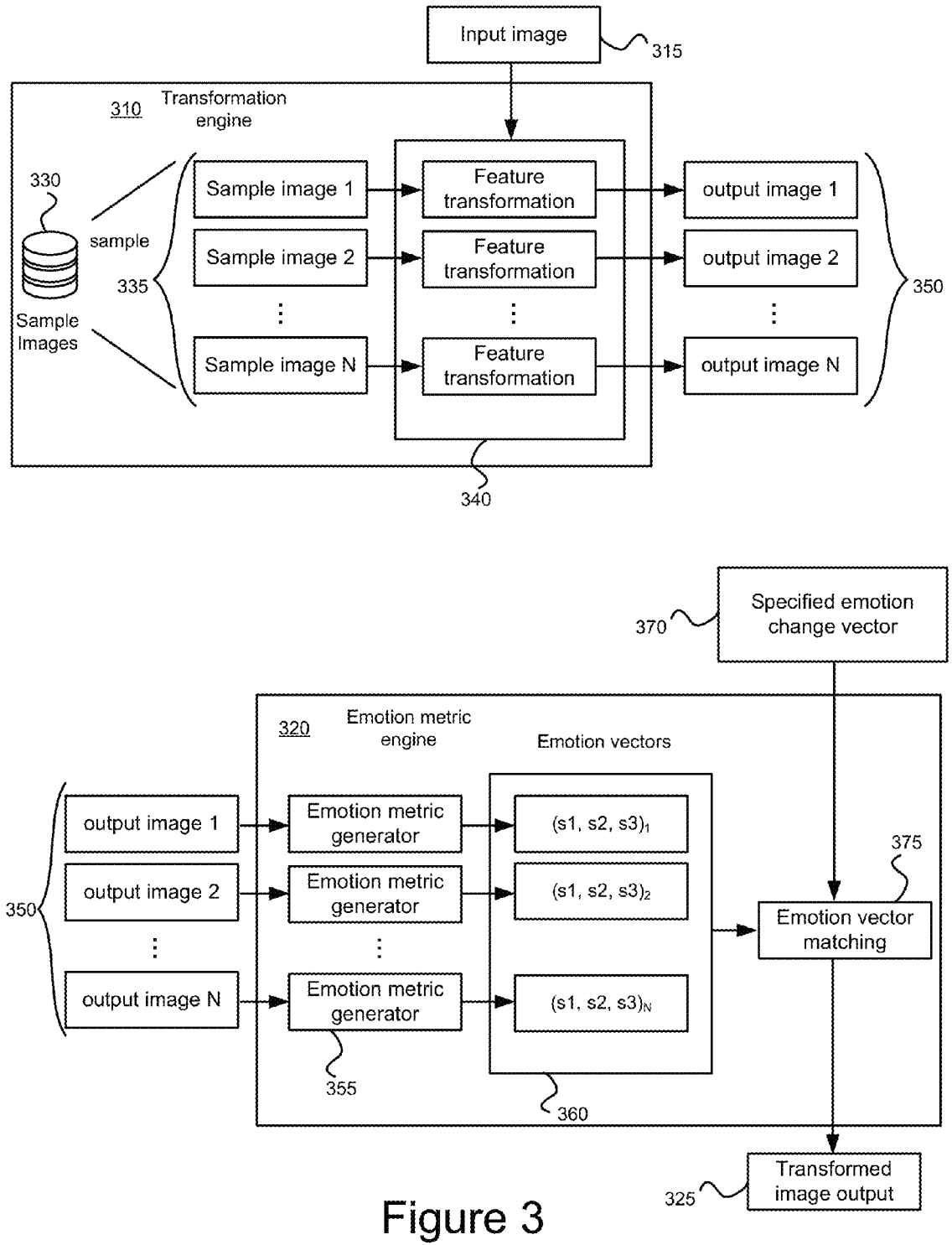
FIG. 3 is a schematic diagram of components of an image emotion modification system, according to an embodiment of the disclosure.

Referring now to FIG. 3, a transformation engine and emotion metric engine (e.g., of FIG. 1) are described in greater detail. Transformation engine 310 includes a database of sample images 330, from which a number N of sample images 335 are sampled. According to some embodiments of the present disclosure, the sampling is performed in a random manner. Other sampling methods known to those of skill in the art are also consistent with the spirit and scope of the present disclosure. The transformation engine 310 receives an input image 315 (e.g., corresponding to the input image 115), and in operation, performs feature transformation 340 on the input image 315. A respective feature transformation is made for each sample image of the N sample images 335. According to an embodiment of the present disclosure, the transformation is performed via a color histogram specification, where feature values (e.g., of the feature categories of Table 1) from the sample image are used to transform the image data of the input image, and thereby the emotion content. Alternatively, the transformation is performed via an edge-histogram specification. Other image transformation techniques are also consistent with the spirit and scope of the present disclosure.

A corresponding number N of output images 350 are generated as a result of feature transformation 340. The N sample images 335 include images from each emotion category (e.g., joy, sadness, non-fear, fear, non-disgust, and disgust), each image having respective features of feature categories from Table 1. According to an embodiment of the present disclosure, output images 350 are generated via feature transformation with a plurality of sample images. That is, rather than a single sample image transformation leading to a single output image, a pipeline of several sample images are used, in combination, to transform the input image 315 and generate an output image 350.

The output images 350 are provided to an emotion metric engine 320. The emotion metric engine 320 includes an emotion metric generator 355, which in operation, measures the emotion conveyed by the output images 350 and generates a corresponding number of emotion vectors 360, where one emotion vector is generated for each of the output images 350. The emotion metric engine 320 receives a specified emotion change 370 (for example, specified emotion change 170) corresponding to a command to modify the emotion conveyed by the input image 315, and performs emotion matching 375 between the specified emotion change 370 and the emotion vectors 360. According to embodiments of the present disclosure, the specified emotion change 370 is in the form of a vector, with magnitudes of the elements of the vector corresponding to the magnitude of change for the corresponding emotion in the emotion space (e.g., emotion space 200). The specified change to emotion can be regarding a single emotion dimension (e.g., 20% more joy), or regarding multiple emotion dimensions.

Given an input image 315 and the desired change of emotion via specified emotion change 370, the system transforms features of the input image 315 with the guidance of a sample image taken from the predefined sample image database 330. The sample image database 330 stores example images corresponding to the different emotions of the emotion space 200, as described herein. In an embodiment, a total of N sample images 335 are randomly sampled from the sample image database 330 and N corresponding output images 350 are generated by the feature transformations 340. According to embodiments of the present disclosure, a value of N=20 can be used to reach a balance between output variety and computational efficiency. Other values of N are consistent with the spirit and scope of the present disclosure.

Using the emotion metric generator 355 to generate the emotion vectors 360 of the N output images 350, the system will output the transformed image 325 with the change of emotion closest to that of the specified emotion modification (e.g., specified emotion change 370). Each emotion metric generator 355 produces one emotion vector 360 that describes the corresponding output image. There are therefore N emotion vectors 360. The specified emotion change vector 370 is used by the system in comparing against the N emotion vectors 360, in order to determine the output image 350 corresponding to the specified emotion change to the input image 315. The system selects the one output image of output images 350 that corresponds to the emotion vector, of the N emotion vectors 360, that is closest to the specified emotion change of the input image 315. According to embodiments of the present disclosure, the closest emotion vector is determined by emotion vector matching 375 via "nearest neighbor" with the specified emotion change vector. Other criteria for determining emotion vector matching are consistent with the spirit and scope of the present disclosure. A transformed image output 325 is generated by selection of the output image of output images 350 that has the determined matching emotion vector. According to an embodiment, the indicated input image emotion modification 370 is a vector input by a user, with element values corresponding to a probability of emotion change for the emotion. That is, a vector having s1=0.2, s2=−0.3, and s3=0.05 corresponds to an emotion modification where the probability of joy increases by 20%; the probability of fear increases by 30%; and the probability of non-disgust increases by 5%.

In one embodiment, the default sampling method of the sample images 330 is random sampling, and the feature transformation 340 used is a color tone adjustment by applying histogram specification to RGB channels, independently. Alternatively, the feature transformation 340 can be made via edge-histogram specification. Advantageously, due to the disparate images in the sample image set, and the sampling, a system according to the present disclosure can generate transformed output images having different color tones than the input image. Other forms of image transformation are consistent with the spirit and scope of the present disclosure. In an embodiment, a distance metric is used to compare the change of emotions in output selector, for example the distance metric may be L2−norm.

In general, each emotion metric generator 355 displayed is the same emotion metric generator, which in operation takes one image and outputs an emotion vector corresponding to the emotion conveyed by the image. Each dimension of the emotion vector describes the magnitude of the corresponding emotion triggered by the input image. In an embodiment, the input to the emotion metric generator is one image (e.g., output image 1) and the output is a 3-dimensional number having elements s1, s2, and s2 corresponding to the 3 dimensions of the emotion space. It should be noted that "N" is a pre-defined number of pipelines specified for operation of the algorithm. A pipeline may be a single image (e.g., a single sample image from sample images 330), or several images. For each pipeline, the emotion metric generator 355 predicts all of the emotions in all of the emotion dimensions. According to embodiments of the present disclosure the number of pipelines is adjustable, where a greater number of pipelines provides greater statistical power to the emotion matching.

Emotion Metric Generation

In an embodiment of the present disclosure, features related to edge, texture, color, saliency, and shape are used to create a 759-dimensional feature set (e.g., the feature set of Table 1). For each image of a sample image database (e.g., sample image database 330), a corresponding feature vector is computed. Each dimension of the feature vector is properly normalized to the range [0, 1]. Randomly splitting each emotion category of the soft-label metric database into a training and a testing set, an emotion predictor $EP_i$ may be trained in each dimension $d_i$ using the training set associated with $d_i$, where i is an element of $\{1, 2, 3\}$. By using standard support vector regression (SVR) with probability estimation provided by LIBSVM (C.-C. Chang and C.-J. Lin, "LIBSVM: A library for support vector machines," *ACM Transactions on Intelligent Systems and Technology*, vol. 2, pp. 27:1-27:27, 2011.), each $EP_i$ predicts $s_i$, the regression value of the corresponding emotion in $d_i$. Specifically, $s_1$, $s_2$, and $s_3$ represent the regression values of joy, non-fear, and non-disgust, respectively. In each $d_i$, higher regression value represents more positive emotion. According to an embodiment of the present disclosure, the parameters of SVR are learned by performing 10-fold cross validation on the training set of the sample image database. The final real-valued emotion predictor EP is formed by cascading all $EP_i$'s such that EP will take an image as input, and output a vector $e=(s_1, s_2, s_3)$ specifying the emotion content in emotion space. According to embodiments of the present disclosure, the final real-valued emotion predictor EP is used to generate an emotion vector for an input image (e.g., emotion metric generator 355).

Figure 4:
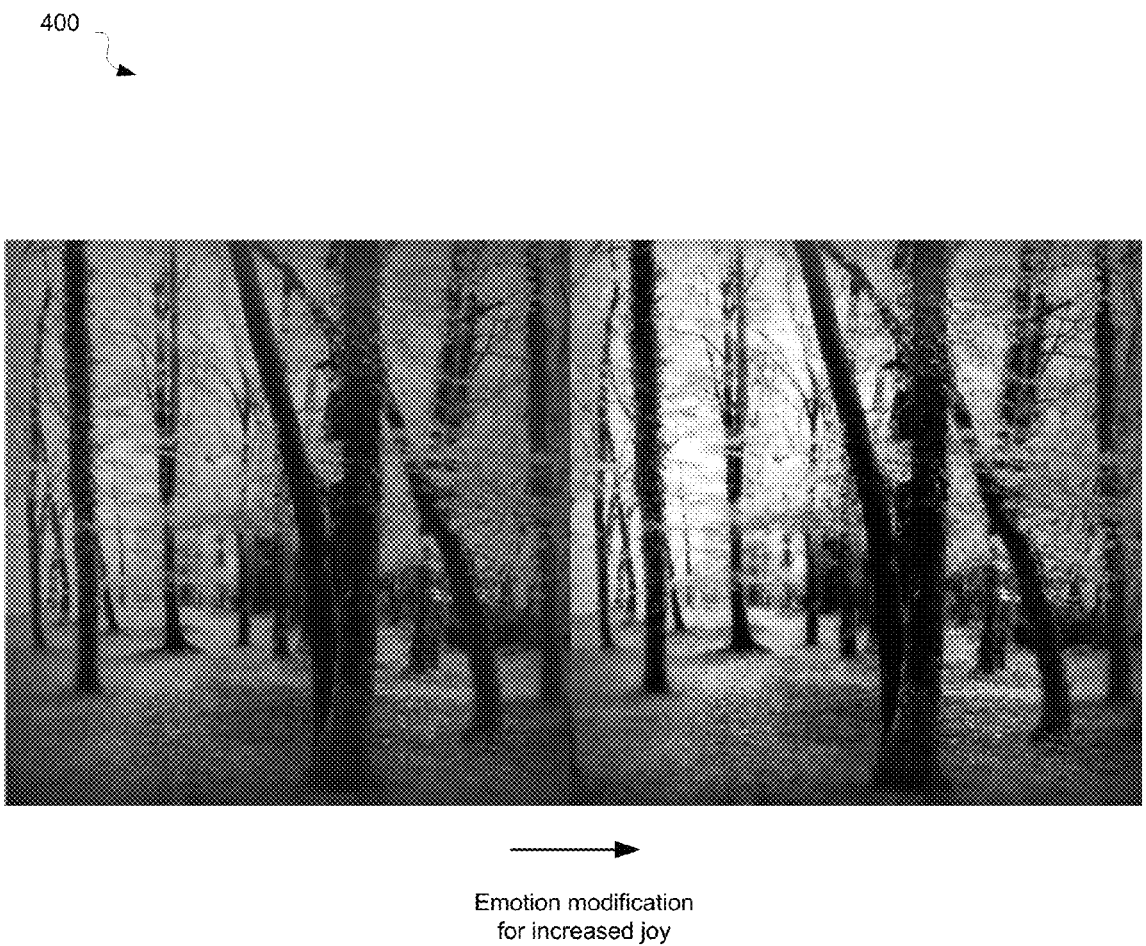
FIG. 4 is an illustration of a change in emotion conveyed by an image, to an embodiment of the disclosure.

Referring now to FIG. 4 an illustration 400 of a change in emotion conveyed by an image according to an embodiment of the disclosure is depicted. The left panel depicts an original input image, while the right panel depicts the image after undergoing an emotion modification according to a method of the present disclosure. As depicted in FIG. 4, the image emotion modification is increased joy. The modification to the original input image can be made via, for example, color histogram specification or edge histogram specification.

Figure 5:
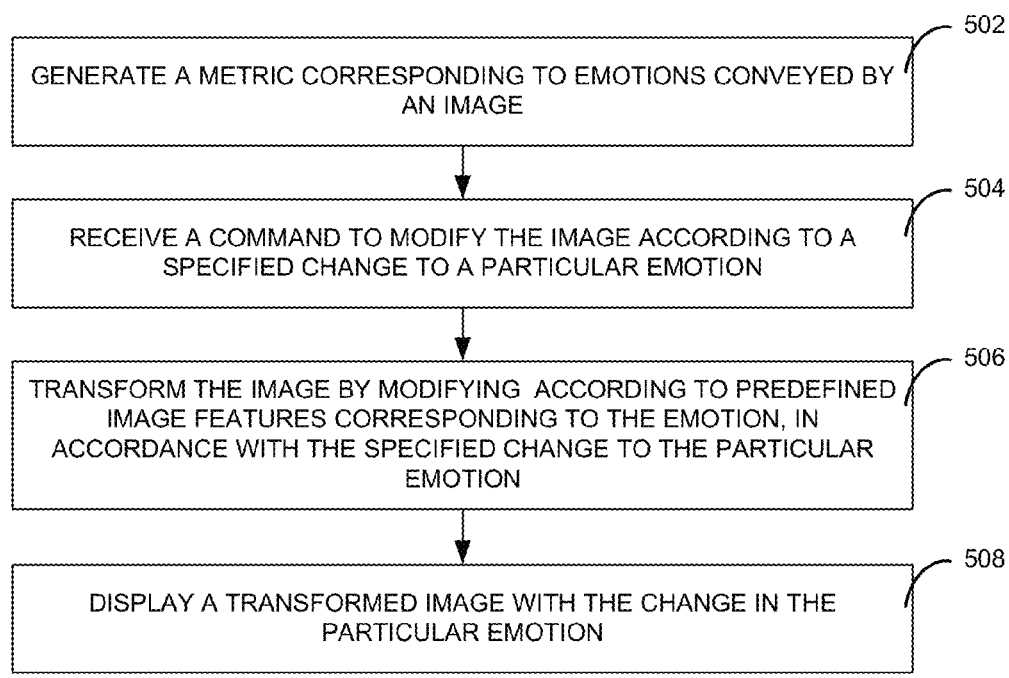
FIG. 5 is a flowchart depicting a method of changing an emotion conveyed by an image, according to an embodiment of the disclosure.

FIG. 5 is a flowchart 500 of an example of a computer-implemented method for modifying the emotion conveyed by an image, in embodiments according to the present disclosure. The flowchart 500 can be implemented as computer-executable instructions residing on some form of non-transitory computer-readable storage medium. The operations of the flowchart 500 can be implemented. Although described using a single input image as an example, the operations can be readily extended to multiple input images.

In block 502 a metric is generated corresponding to emotions conveyed by an image. The metric measures emotion conveyed by the image, based on the image data (for example, image data 115 received by image modification system 105). The emotion conveyed can be determined by emotion metric engine 120, and can include characterization of the emotion conveyed via a vector, where elements of the vector indicate magnitudes of emotions in an emotion space (e.g., emotion space 200).

In block 504 data a command is received to modify the image according to a specified change to a particular emotion, for example specified change to emotion 170. The specified change to emotion can be made via a keyword (e.g., more "fear"), and/or via an emotion vector specifying the magnitude of emotion change.

In block 506 the image is transformed by modifying the image according to predefined image features corresponding to the emotion, in accordance with the specified change to the particular emotion. The transformed image can be transformed via color histogram specification, or some other image transformation means. The image transformation includes transformation of features of the input image using features of a sample image. The sample image is selected from a sample image database, where the sample image database includes a set of images corresponding to each emotion of an emotion space (e.g., of emotion space 200). The sample image selection for transforming the input image is made based on matching a predicted emotion conveyed by the sample image with the emotion conveyed by the modified input image, that is, the emotion conveyed by the input image following the specified change to emotion (e.g., specified change to emotion 170).

In block 508 a transformed image is displayed, the transformed image modified according to the specified change to emotion (e.g., output image 125).

Aspects of the present disclosure may be embodied in a computer-readable media including program instructions to implement various operations embodied by a computer or computing device (e.g., a cellular phone, tablet device, etc.). The media may also include, alone or in combination with the program instructions, data files, data structures, and the like. The media and program instructions may be those specially designed and constructed for the purposes of the example embodiments of the present disclosure, or they may be of the kind well-known and available to those having skill in the computer software arts. Examples of computer-readable media include magnetic media such as hard disks, floppy disks, and magnetic tape, optical media, for example, CD ROM disks and DVD, magneto-optical media, for example, optical disks, and hardware devices that may be specially configured to store and perform program instructions, for example, read-only memory (ROM), random access memory (RAM), flash memory, and the like. Aspects of the present disclosure may also be realized as a data signal embodied in a carrier wave and comprising a program readable by a computer and transmittable over the Internet. Examples of program instructions include both machine code, for example, produced by a compiler, and files containing higher level code that may be executed by the computer using an interpreter. The described hardware devices may be configured to act as one or more software modules in order to perform the operations of the above-described example embodiments of the present disclosure.

Embodiments of the present disclosure are thus described. While the present disclosure has been described in particular embodiments, it should be appreciated that the present disclosure should not be construed as limited by such embodiments, but rather construed according to the following claims.

What is claimed is:

1. A method of modifying an input image to change an emotion conveyed by the image, the method comprising:
accessing two or more sample images stored in a memory;
transforming the input image using each of the sample images to generate output images;
generating a metric for each output image corresponding to emotion conveyed by said output image, the emotion arranged along a plurality of emotion dimensions;
receiving a command to modify an emotion in the input image according to a specified emotion change identified by a user;
obtaining an emotion-transformed input image by selecting the output image whose generated metric is closest to the specified change; and
displaying the emotion-transformed input image.

2. The method according to claim 1, wherein the metric comprises values corresponding to magnitudes of the emotions conveyed.

3. The method according to claim 2, wherein the specified emotion change comprises a magnitude of change.

4. The method according to claim 2, wherein the metric is arranged in a vector comprising elements corresponding to the plurality of emotion dimensions.

5. The method according to claim 1, wherein the plurality of emotion dimensions comprises orthogonal axes, and wherein pairs of negatively correlated emotions are arranged on opposing ends of the orthogonal axes.

6. The method according to claim 5, wherein the pairs of negatively correlated emotions comprise joy and sadness; fear and non-fear; and disgust and non-disgust.

7. The method according to claim 5, wherein the specified change to the particular emotion comprises a keyword associated with the pairs of negatively correlated emotions.

8. The method according to claim 1, wherein the predefined image features comprise edge features, texture, color, saliency, and shape, and wherein modifying the image comprises modifying according to one of color histogram specification and edge-histogram specification.

9. An apparatus comprising:
a display;
a memory configured to store instructions; and
a processor communicatively coupled with the display and the memory and configured to execute the instructions, wherein the instructions cause the processor to
access two or more sample images stored in the memory;
transforming an input image using each of the sample images to generate output images;
generate a metric for each output image corresponding to emotion conveyed by said output image, the emotions arranged along a plurality of emotion dimensions;
receive a command to modify an emotion in the input image according to a specified emotion change identified by the user;
obtain an emotion-transformed input image by selecting the output image whose generated metric is closest to the specified change;
display the emotion-transformed image with the change in the particular emotion.

10. The apparatus according to claim 9, wherein the metric comprises values corresponding to magnitudes of the emotions conveyed.

11. The apparatus according to claim 10, wherein the specified emotion change comprises a magnitude of change.

12. The apparatus according to claim 10, wherein the metric is arranged in a vector comprising elements corresponding to the plurality of emotion dimensions.

13. The apparatus according to claim 9, wherein the plurality of emotion dimensions comprises orthogonal axes, and wherein pairs of negatively correlated emotions are arranged on opposing ends of the orthogonal axes.

14. The apparatus according to claim 13, wherein the pairs of negatively correlated emotions comprise joy and sadness; fear and non-fear; and disgust and non-disgust.

15. The apparatus according to claim 13, wherein the specified change to the particular emotion comprises a keyword associated with the pairs of negatively correlated emotions.

16. The apparatus according to claim 9, wherein the predefined image features comprise edge features, texture, color, saliency, and shape, and wherein modifying the image comprises modifying according to one of color histogram specification and edge-histogram specification.

17. A non-transitory computer readable medium containing programmed instructions, which, when executed by a processor in an image processing system, cause the processor to perform operations comprising:
accessing two or more sample images stored in a memory of the image processing system;
transforming an input images using each of the sample images to generate output images;
generating a metric for each output image corresponding to emotions conveyed by said output image, the emotions arranged along a plurality of emotion dimensions;
receiving a command to modify an emotion in the input image according to a specified emotion change identified by a user;
obtaining an emotion-transformed input image by selecting the output image whose generated metric is closest to the specified change; and
displaying the emotion-transformed input image.

18. The non-transitory computer readable medium according to claim 17, wherein the metric comprises values corresponding to magnitudes of the emotions conveyed.

19. The non-transitory computer readable medium according to claim 17, wherein the predefined image features comprise edge features, texture, color, saliency, and shape, and wherein modifying the image comprises modifying according to one of color histogram specification and edge-histogram specification.

20. The non-transitory computer readable medium according to claim 19, wherein the predefined image features are based on a sample image associated with the particular emotion.

* * * * *

UNITED STATES PATENT AND TRADEMARK OFFICE
CERTIFICATE OF CORRECTION

PATENT NO. : 9,679,380 B2
APPLICATION NO. : 14/606340
DATED : June 13, 2017
INVENTOR(S) : Kuan-chuan Peng et al.

It is certified that error appears in the above-identified patent and that said Letters Patent is hereby corrected as shown below:

In the Claims

Column 11, Lines 8-22, Claim 1, should read:
1. A method of modifying an input image to change an emotion conveyed by the image, the method comprising:
    accessing two or more sample images stored in a memory;
    transforming the input image using each of the sample images, by modifying the input image according to predefined image features extracted from each of the sample images, to generate output images;
    generating a metric for each output image corresponding to emotion conveyed by said output image, the emotion arranged along a plurality of emotion dimensions;
    receiving a command to modify an emotion in the input image according to a specified emotion change identified by a user;
    obtaining an emotion-transformed input image by selecting the output image whose generated metric is closest to the specified change; and
    displaying the emotion-transformed input image.

Column 11, Lines 46-62, through Column 12, Lines 1-5, Claim 9, should read:
9. An apparatus comprising:
    a display;
    a memory configured to store instructions; and
    a processor communicatively coupled with the display and the memory and configured to execute the instructions, wherein the instructions cause the processor to
    access two or more sample images stored in the memory;
    transforming an input image using each of the sample images, by modifying the input image according to predefined image features extracted from each of the sample images, to generate output images;
    generate a metric for each output image corresponding to emotion conveyed by said output Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office* image, the emotion arranged along a plurality of emotion dimensions;

receive a command to modify an emotion in the input image according to the specified emotion change identified by the user;

obtain an emotion-transformed input image by selecting the output image whose generated metric is closest to the specified change;

display the emotion-transformed image with the change in the particular emotion.

In Column 12, Lines 30-48, Claim 17, should read:

17. A non-transitory computer readable medium containing programmed instructions, which, when executed by a processor in an image processing system, cause the processor to perform operations comprising:

accessing two or more sample images stored in a memory of the image processing system;

transforming an input image using each of the sample images, by modifying the input image according to predefined image features extracted from each of the sample images, to generate output images;

generating a metric for each output image corresponding to emotion conveyed by said output image, the emotion arranged along a plurality of emotion dimensions;

receiving a command to modify an emotion in the input image according to a specified emotion change identified by a user;

obtaining an emotion-transformed input image by selecting the output image whose generated metric is closest to the specified change; and displaying the emotion-transformed input image.